(12) United States Patent
Hendrix et al.

(10) Patent No.: US 10,152,960 B2
(45) Date of Patent: Dec. 11, 2018

(54) SYSTEMS AND METHODS FOR DISTRIBUTED ADAPTIVE NOISE CANCELLATION

(71) Applicant: Cirrus Logic International Semiconductor Ltd., Edinburgh (GB)

(72) Inventors: Jon D. Hendrix, Wimberley, TX (US); Nitin Kwatra, Austin, TX (US); Jeffrey D. Alderson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 42 days.

(21) Appl. No.: 15/053,792

(22) Filed: Feb. 25, 2016

(65) Prior Publication Data
US 2017/0084263 A1 Mar. 23, 2017

Related U.S. Application Data

(60) Provisional application No. 62/221,968, filed on Sep. 22, 2015.

(51) Int. Cl.
*G10K 11/16* (2006.01)
*G10K 11/178* (2006.01)
(Continued)

(52) U.S. Cl.
CPC ......... *G10K 11/178* (2013.01); *H04R 1/1083* (2013.01); *G10K 11/1787* (2018.01);
(Continued)

(58) Field of Classification Search
CPC ....... G10K 11/178–11/1788; G10K 2210/108; G10K 2210/1081; G10K 2210/1082;
(Continued)

(56) References Cited

U.S. PATENT DOCUMENTS 5,138,664 A * 8/1992 Kimura ............. G10K 11/1782
381/71.13
6,021,207 A 2/2000 Puthuff et al.
(Continued)

OTHER PUBLICATIONS

International Search Report and Written Opinion of the International Searching Authority, International Application No. PCT/US2016/049900, dated Dec. 12, 2016.
(Continued)

*Primary Examiner* — Xu Mei
(74) *Attorney, Agent, or Firm* — Jackson Walker L.L.P.

(57) ABSTRACT

An integrated circuit may include an output for providing a signal to a transducer including both source audio for playback to a listener and an anti-noise signal for countering the effects of ambient audio sounds in an acoustic output of the transducer, a microphone input for receiving a microphone signal indicative of ambient sounds at the transducer, a link control input for receiving link control information of a communications link coupling the integrated circuit to the transducer and/or a microphone for generating the microphone signal, wherein the link control information includes a link quality metric of the communications link, and a processing circuit comprising a filter having a response that generates the anti-noise signal in conformity with the microphone signal to minimize the ambient sounds at the acoustic output of the transducer, wherein the processing circuit modifies generation of the anti-noise signal responsive to the link quality metric.

24 Claims, 3 Drawing Sheets

(51) Int. Cl.
    *H04R 1/10*    (2006.01)
    *H04M 1/60*    (2006.01)
(52) U.S. Cl.
    CPC .. *G10K 11/17885* (2018.01); *G10K 2210/108* (2013.01); *G10K 2210/1081* (2013.01); *G10K 2210/3026* (2013.01); *G10K 2210/3027* (2013.01); *G10K 2210/3028* (2013.01); *H04M 1/6025* (2013.01); *H04M 1/6058* (2013.01); *H04R 2460/01* (2013.01)
(58) Field of Classification Search
    CPC ... G10K 2210/3026; G10K 2210/3027; G10K 2210/3035; G10K 2210/30351; G10K 2210/3221
    USPC ................. 381/71.1–71.14, 26, 309, 72, 74
    See application file for complete search history.

(56) References Cited

U.S. PATENT DOCUMENTS

| | | | | |
|---|---|---|---|---|
| 6,522,753 | B1* | 2/2003 | Matsuzawa | G10K 11/178 381/123 |
| 7,430,255 | B2* | 9/2008 | Shibuya | G10L 21/0208 375/346 |
| 8,103,235 | B2* | 1/2012 | Shiotsu | H04B 1/126 455/226.3 |
| 8,340,318 | B2* | 12/2012 | Copley | G10K 11/1788 381/71.1 |
| 8,571,226 | B2* | 10/2013 | Isberg | G10K 11/1788 381/104 |
| 8,737,636 | B2* | 5/2014 | Park | G10K 11/178 381/71.1 |
| 9,014,387 | B2* | 4/2015 | Hendrix | G10K 11/175 381/58 |
| 9,142,207 | B2 | 9/2015 | Hendrix et al. | |
| 2007/0165838 | A1* | 7/2007 | Li | H04M 9/082 379/406.01 |
| 2009/0181632 | A1 | 7/2009 | Shiba et al. | |
| 2013/0204617 | A1 | 8/2013 | Kuo et al. | |
| 2015/0003622 | A1* | 1/2015 | Lee | H04R 1/1033 381/71.6 |
| 2015/0161980 | A1 | 6/2015 | Alderson et al. | |
| 2015/0230021 | A1* | 8/2015 | Donaldson | H04R 1/1083 381/74 |
| 2016/0351182 | A1* | 12/2016 | Heo | G10K 11/178 |

OTHER PUBLICATIONS

Kuo, Sen M., and Morgan, Dennis, R., Active Noise Control: A Tutorial Review, Proceedings of the IEEE, vol. 87, No. 6, Jun. 1999, pp. 943-973.

* cited by examiner

SYSTEMS AND METHODS FOR DISTRIBUTED ADAPTIVE NOISE CANCELLATION

RELATED APPLICATION

The present disclosure claims priority to U.S. Provisional Patent Application Ser. No. 62/221,968, filed Sep. 22, 2015, which is incorporated by reference herein in its entirety.

FIELD OF DISCLOSURE

The present disclosure relates in general to adaptive noise cancellation in connection with an acoustic transducer, and more particularly, to detection and cancellation of ambient noise present in the vicinity of the acoustic transducer, and control of adaptive noise cancellation in a distributed adaptive noise cancellation system.

BACKGROUND

Wireless telephones, such as mobile/cellular telephones, cordless telephones, and other consumer audio devices, such as mp3 players, are in widespread use. Performance of such devices with respect to intelligibility can be improved by providing noise cancelling using a microphone to measure ambient acoustic events and then using signal processing to insert an anti-noise signal into the output of the device to cancel the ambient acoustic events.

A stereo headset with one or two microphones and a speaker per ear, coupled to a personal audio device, such as a wireless telephone, cordless telephone, or other consumer audio devices, may include an adaptive active noise cancellation (ANC) circuit that is not co-located with transducers associated with the ANC circuit, such as microphones and speakers, thus forming a "distributed" ANC system in which the adaptive ANC circuitry is separated from the transducers by a digital link. In some circumstances, the digital link may become unreliable or fail. In such case, the communication between the transducers and the adaptive ANC circuitry may be interrupted. In such a scenario, erroneous data may be passed between the adaptive ANC circuitry and the transducers, or the data may cease altogether. Accordingly, it may be desirable to prevent objectionable audible artifacts that may occur as a result of failure or unreliability of the digital link.

SUMMARY

In accordance with the teachings of the present disclosure, certain disadvantages and problems associated with existing approaches to filtering signals may be reduced or eliminated.

In accordance with embodiments of the present disclosure, an integrated circuit for implementing at least a portion of a personal audio device may include an output for providing a signal to a transducer including both source audio for playback to a listener and an anti-noise signal for countering the effects of ambient audio sounds in an acoustic output of the transducer, a microphone input for receiving a microphone signal indicative of ambient audio sounds at the transducer, a link control input for receiving link control information of a communications link coupling the integrated circuit to one or more of the transducer and a microphone for generating the microphone signal, wherein the link control information includes a link quality metric of the communications link, and a processing circuit comprising a filter having a response that generates the anti-noise signal in conformity with the microphone signal to minimize the ambient audio sounds at the acoustic output of the transducer, wherein the processing circuit modifies generation of the anti-noise signal responsive to the link quality metric.

In accordance with these and other embodiments of the present disclosure, a method may include receiving link control information of a communications link configured to couple an integrated circuit to one or more of: (i) a transducer for generating sound in response to a signal including both source audio for playback to a listener and an anti-noise signal for countering the effects of ambient audio sounds in an acoustic output of the transducer and (ii) a microphone for generating a microphone signal indicative of ambient audio sounds at the transducer, wherein the link control information includes a link quality metric of the communications link. The method may also include generating with a filter the anti-noise signal in conformity with the microphone signal to minimize the ambient audio sounds at the acoustic output of the transducer. The method may further include modifying generation of the anti-noise signal responsive to the link quality metric.

Technical advantages of the present disclosure may be readily apparent to one of ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The present disclosure encompasses noise cancelling techniques and circuits that can be implemented in a personal audio device, such as a wireless telephone. The personal audio device includes an ANC circuit that may measure the ambient acoustic environment and generate a signal that is injected in the speaker (or other transducer) output to cancel ambient acoustic events. A reference microphone may be provided to measure the ambient acoustic environment, and an error microphone may be included for controlling the adaptation of the anti-noise signal to cancel the ambient audio sounds and for correcting for the electro-acoustic path from the output of the processing circuit through the transducer.

Figure 1A:
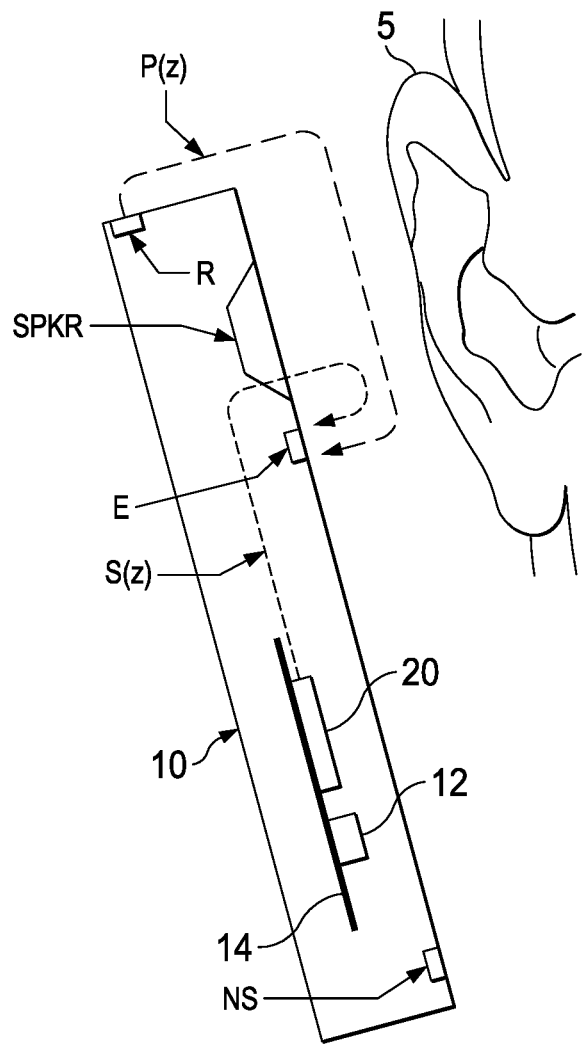
FIG. 1A is an illustration of an example wireless mobile telephone, in accordance with embodiments of the present disclosure.

Referring now to FIG. 1A, a wireless telephone 10 as illustrated in accordance with embodiments of the present disclosure is shown in proximity to a human ear 5. Wireless telephone 10 is an example of a device in which techniques in accordance with embodiments of this disclosure may be employed, but it is understood that not all of the elements or configurations embodied in illustrated wireless telephone 10, or in the circuits depicted in subsequent illustrations, are required in order to practice the inventions recited in the claims. Wireless telephone 10 may include a transducer such as speaker SPKR that reproduces distant speech received by wireless telephone 10, along with other local audio events such as ringtones, stored audio program material, injection of near-end speech (i.e., the speech of the user of wireless telephone 10) to provide a balanced conversational perception, and other audio that requires reproduction by wireless telephone 10, such as sources from webpages or other network communications received by wireless telephone 10 and audio indications such as a low battery indication and other system event notifications. A near-speech microphone NS may be provided to capture near-end speech, which is transmitted from wireless telephone 10 to the other conversation participant(s).

Wireless telephone 10 may include ANC circuits and features that inject an anti-noise signal into speaker SPKR to improve intelligibility of the distant speech and other audio reproduced by speaker SPKR. A reference microphone R may be provided for measuring the ambient acoustic environment and may be positioned away from the typical position of a user's mouth, so that the near-end speech may be minimized in the signal produced by reference microphone R. Another microphone, error microphone E, may be provided in order to further improve the ANC operation by providing a measure of the ambient audio combined with the audio reproduced by speaker SPKR close to ear 5, when wireless telephone 10 is in close proximity to ear 5. In other embodiments, additional reference and/or error microphones may be employed. Circuit 14 within wireless telephone 10 may include an audio CODEC integrated circuit (IC) 20 that receives the signals from reference microphone R, near-speech microphone NS, and error microphone E and interfaces with other integrated circuits, such as a radio-frequency (RF) integrated circuit 12 having a wireless telephone transceiver. In some embodiments of the disclosure, the circuits and techniques disclosed herein may be incorporated in a single integrated circuit that includes control circuits and other functionality for implementing the entirety of the personal audio device, such as an MP3 player-on-a-chip integrated circuit. In these and other embodiments, the circuits and techniques disclosed herein may be implemented partially or fully in software and/or firmware embodied in computer-readable media and executable by a controller or other processing device.

In general, ANC techniques of the present disclosure measure ambient acoustic events (as opposed to the output of speaker SPKR and/or the near-end speech) impinging on reference microphone R, and by also measuring the same ambient acoustic events impinging on error microphone E, ANC processing circuits of wireless telephone 10 adapt an anti-noise signal generated from the output of reference microphone R to have a characteristic that minimizes the amplitude of the ambient acoustic events at error microphone E. Because acoustic path P(z) extends from reference microphone R to error microphone E, ANC circuits are effectively estimating acoustic path P(z) while removing effects of an electro-acoustic path S(z) that represents the response of the audio output circuits of wireless telephone 10 and the acoustic/electric transfer function of speaker SPKR including the coupling between speaker SPKR and error microphone E in the particular acoustic environment, which may be affected by the proximity and structure of ear 5 and other physical objects and human head structures that may be in proximity to wireless telephone 10, when wireless telephone 10 is not firmly pressed to ear 5. While the illustrated wireless telephone 10 includes a two-microphone ANC system with a third near-speech microphone NS, some aspects of the present invention may be practiced in a system that does not include separate error and reference microphones, or a wireless telephone that uses near-speech microphone NS to perform the function of the reference microphone R. Also, in personal audio devices designed only for audio playback, near-speech microphone NS will generally not be included, and the near-speech signal paths in the circuits described in further detail below may be omitted, without changing the scope of the disclosure, other than to limit the options provided for input to the microphone.

Figure 1B:
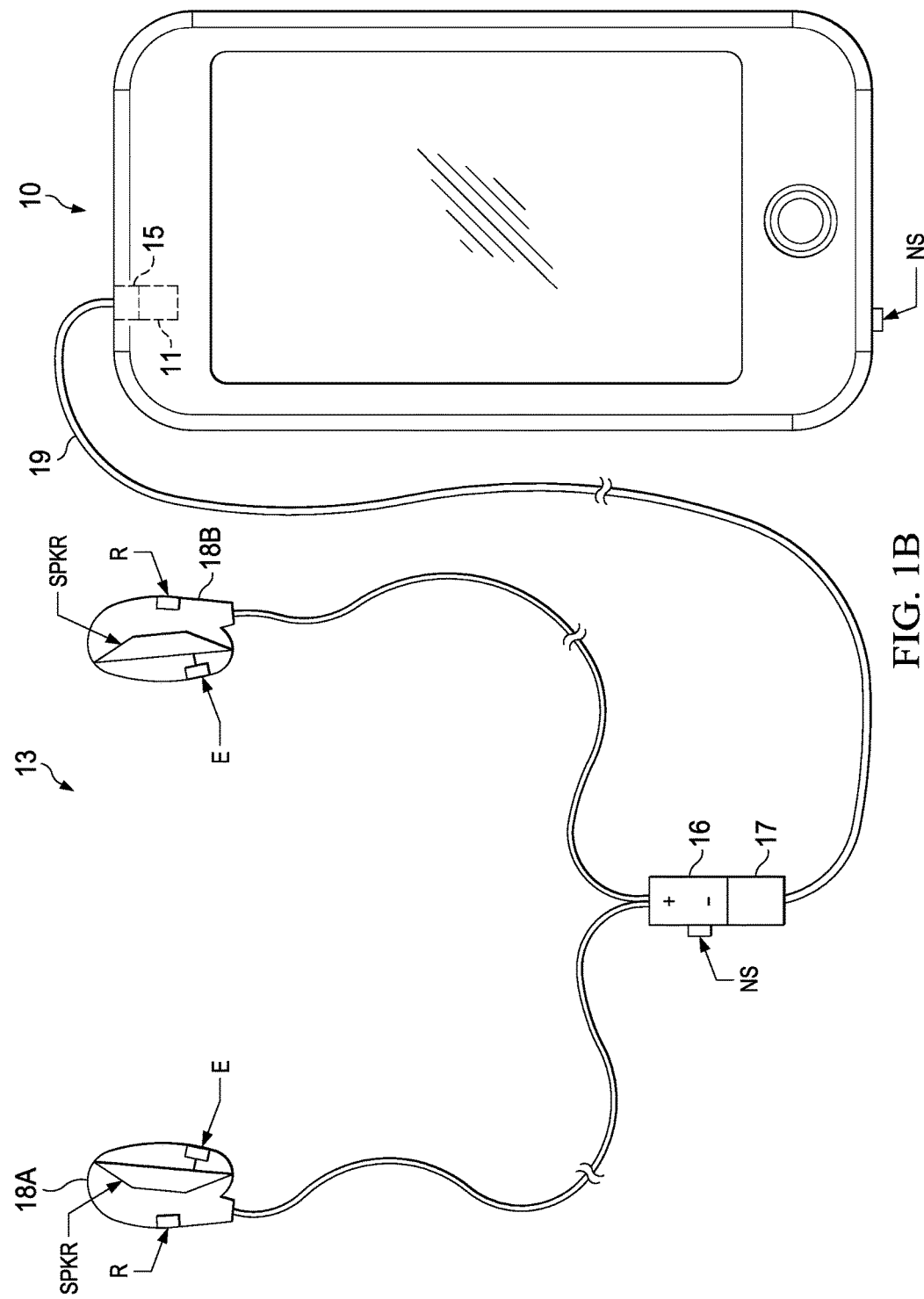
FIG. 1B is an illustration of an example wireless mobile telephone with a headphone assembly coupled thereto via a digital communications link, in accordance with embodiments of the present disclosure.

Referring now to FIG. 1B, wireless telephone 10 is depicted having a headphone assembly 13 coupled to it via audio port 15. Audio port 15 may be communicatively coupled to RF integrated circuit 12 and/or ANC circuit 30 (FIG. 2, below), thus permitting communication between components of headphone assembly 13 and one or more of RF integrated circuit 12 and/or ANC circuit 30. As shown in FIG. 1B, headphone assembly 13 may include a combox 16, a left headphone 18A, and a right headphone 18B.

As used in this disclosure, the term "headphone" broadly includes any loudspeaker and structure associated therewith that is intended to be mechanically held in place proximate to a listener's ear canal, and includes without limitation earphones, earbuds, and other similar devices. As more specific examples, "headphone" may refer to intra-concha earphones, supra-concha earphones, and supra-aural earphones.

Combox 16 or another portion of headphone assembly 13 may have a near-speech microphone NS to capture near-end speech in addition to or in lieu of near-speech microphone NS of wireless telephone 10. In addition, each headphone 18A, 18B may include a transducer such as speaker SPKR that reproduces distant speech received by wireless telephone 10, along with other local audio events such as ringtones, stored audio program material, injection of near-end speech (i.e., the speech of the user of wireless telephone 10) to provide a balanced conversational perception, and other audio that requires reproduction by wireless telephone 10, such as sources from webpages or other network communications received by wireless telephone 10 and audio indications such as a low battery indication and other system event notifications. Each headphone 18A, 18B may include a reference microphone R for measuring the ambient acoustic environment and an error microphone E for measuring of the ambient audio combined with the audio reproduced by speaker SPKR close to a listener's ear when such headphone 18A, 18B is engaged with the listener's ear. In some embodiments, ANC circuit 30 may receive the signals from reference microphone R and error microphone E of each headphone and near-speech microphone NS and perform adaptive noise cancellation for each headphone as described herein. In other embodiments, an ANC circuit or another circuit may be present within headphone assembly 13, communicatively coupled to reference microphone R, near-speech microphone NS, and error microphone E, and configured to perform adaptive noise cancellation as described herein.

As also shown in FIG. 1B, headphone assembly 13 may include link control 17 which creates a communications interface between headphone assembly 13 and digital communications link 19 and wireless telephone 10 may include link control 11 which creates a communications interface between wireless telephone 10 and digital communications link 19. Thus, wireless telephone 10 and headphone assembly 13 form a co-located ANC system in that a distributed adaptive ANC system has transducers (e.g., reference microphone R, near-speech signal NS, speaker SPKR) which are not coupled to ANC circuit 30 by a set of dedicated physical wires, but instead are communicatively coupled to the ANC circuitry via shared digital communications link 19. Shared digital communications link 19 may have other non-ANC traffic and may be more subject to interference from the external environment than traditional non-distributed ANC approaches.

Although FIG. 1B depicts a digital communications link 19 as a wired connection, in some embodiments, digital communications link 19 may include a wireless communication interface (e.g., BLUETOOTH® interface) in order to communicate between headphone assembly 13 and wireless telephone 10.

Communications between wireless telephone 10 and headphone assembly 13 may be carried out via digital communications link 19 in any suitable manner. For example, in some embodiments, such communications may be carried out in accordance with those methods and systems disclosed in U.S. Provisional Patent Application No. 62/246,972, filed Oct. 27, 2015, entitled "Transfer of Data with Check Bits," and incorporated by reference herein in its entirety.

Figure 2:
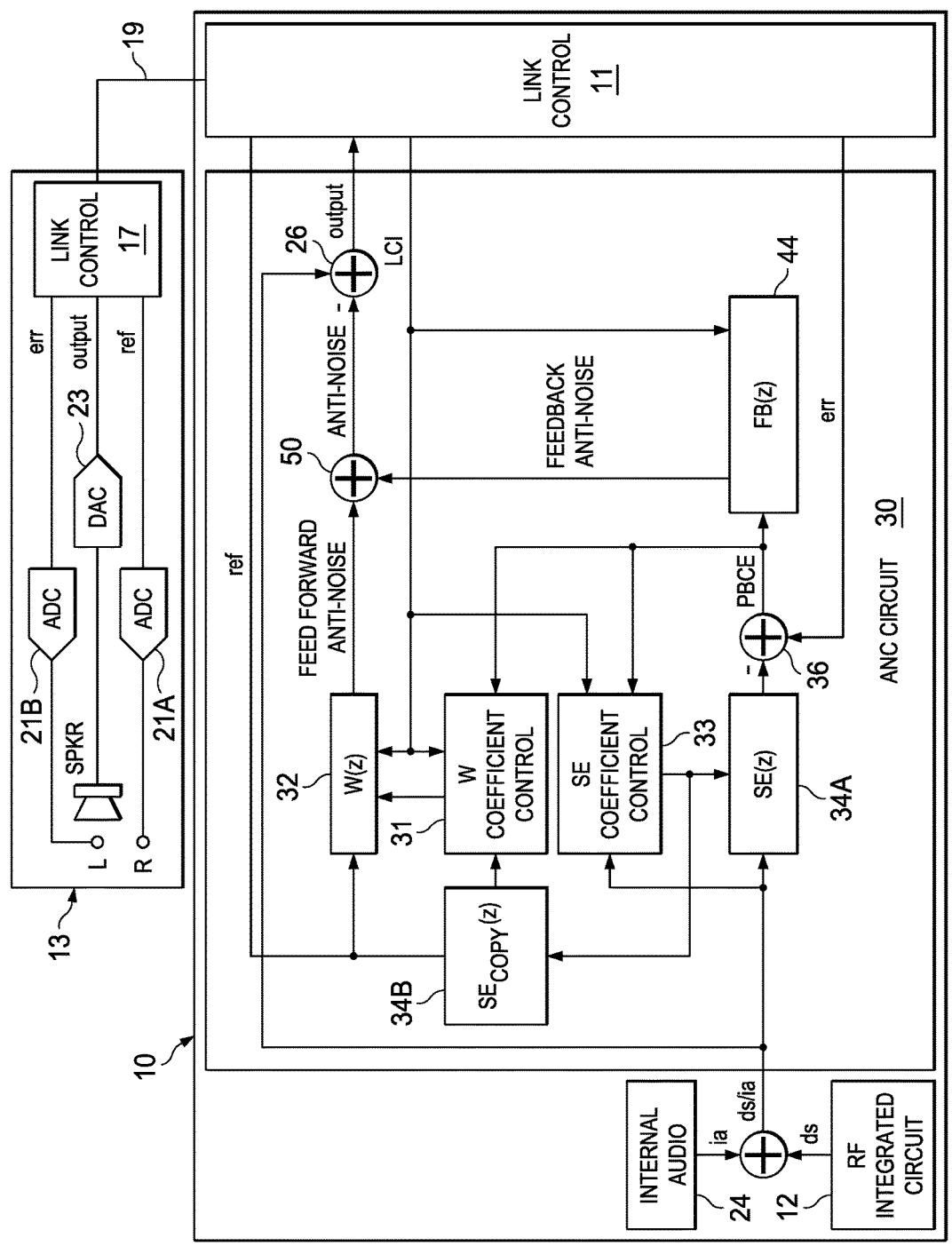
FIG. 2 is a block diagram of selected circuits within the wireless mobile telephone and headphone assembly depicted in FIG. 1B, in accordance with embodiments of the present disclosure.

Referring now to FIG. 2, selected circuits within wireless telephone 10 and headphone assembly 13 are shown in a block diagram, which in other embodiments may be placed in whole or in part in other locations such as one or more headphones or earbuds. In addition to link control 17, headphone assembly 13 may include an analog-to-digital converter (ADC) 21A for receiving the reference microphone signal from microphone R and generating a digital representation ref of the reference microphone signal for communication to wireless telephone 10 via digital communications link 19, and an ADC 21B for receiving the error microphone signal from error microphone E and generating a digital representation err of the error microphone signal for communication to wireless telephone 10 via digital communications link 19. Headphone assembly 13 may also include a digital-to-analog converter (DAC) 23 for receiving a digital output audio signal from wireless telephone 10 via digital communications link 19 and converting the digital audio output signal to an analog signal for driving speaker SPKR.

Wireless telephone 10 may include an ANC circuit 30 for performing adaptive ANC. ANC circuit 30 may include combiner 26 to combine audio signals is from internal audio sources 24, downlink speech ds which may be received from radio frequency (RF) integrated circuit 12, and the anti-noise signal generated by ANC circuit 30 (which by convention has the same polarity as the noise in reference microphone signal ref and is therefore subtracted by combiner 26), thus generating a digital output audio signal for communication to wireless telephone 10 via digital communications link 19.

Adaptive filter 32 may receive reference microphone signal ref from headphone assembly 13 via digital communications link 19 and under ideal circumstances, may adapt its transfer function W(z) to be P(z)/S(z) to generate a feedforward anti-noise component of the anti-noise signal, which may be combined by combiner 50 with a feedback anti-noise component of the anti-noise signal (described in greater detail below) to generate an anti-noise signal which in turn may be provided to output combiner 26 that combines the anti-noise signal with the source audio signal to be reproduced by speaker SPKR. The coefficients of adaptive filter 32 may be controlled by a W coefficient control block 31 that uses a correlation of signals to determine the response of adaptive filter 32, which generally minimizes the error, in a least-mean squares sense, between those components of reference microphone signal ref present in error microphone signal err received from headphone assembly 13 via digital communications link 19. The signals compared by W coefficient control block 31 may be the reference microphone signal ref as shaped by a copy of an estimate of the response of path S(z) provided by filter 34B and another signal that includes error microphone signal err. By transforming reference microphone signal ref with a copy of the estimate of the response of path S(z), response $SE_{COPY}(z)$, and minimizing the ambient audio sounds in the error microphone signal err, adaptive filter 32 may adapt to the desired response of P(z)/S(z). In addition to error microphone signal err, the signal compared to the output of filter 34B by W coefficient control block 31 may include an inverted amount of downlink audio signal ds and/or internal audio signal ia that has been processed by filter response SE(z), of which response $SE_{COPY}(z)$ is a copy. By injecting an inverted amount of downlink audio signal ds and/or internal audio signal ia, adaptive filter 32 may be prevented from adapting to the relatively large amount of downlink audio and/or internal audio signal present in error microphone signal err. However, by transforming that inverted copy of downlink audio signal ds and/or internal audio signal ia with the estimate of the response of path S(z), the downlink audio and/or internal audio that is removed from error microphone signal err should match the expected version of downlink audio signal ds and/or internal audio signal ia reproduced at error microphone signal err, because the electrical and acoustical path of S(z) is the path taken by downlink audio signal ds and/or internal audio signal ia to arrive at error microphone E. Filter 34B may not be an adaptive filter, per se, but may have an adjustable response that is tuned to match the response of adaptive filter 34A, so that the response of filter 34B tracks the adapting of adaptive filter 34A.

To implement the above, adaptive filter 34A may have coefficients controlled by SE coefficient control block 33, which may compare downlink audio signal ds and/or internal audio signal ia and error microphone signal err after removal of the above-described filtered downlink audio signal ds and/or internal audio signal ia, that has been filtered by adaptive filter 34A to represent the expected downlink audio delivered to error microphone E, and which is removed from the output of adaptive filter 34A by a combiner 36 to generate a playback-corrected error, shown as PBCE in FIG. 2. SE coefficient control block 33 may correlate the actual downlink speech signal ds and/or internal audio signal ia with the components of downlink audio signal ds and/or internal audio signal ia that are present in error microphone signal err. Adaptive filter 34A may thereby be adapted to generate a signal from downlink audio signal ds and/or internal audio signal ia, that when subtracted from error microphone signal err, contains the content of error microphone signal err that is not due to downlink audio signal ds and/or internal audio signal ia.

As depicted in FIG. 2, ANC circuit 30 may also comprise feedback filter 44. Feedback filter 44 may receive the playback corrected error signal PBCE and may apply a response FB(z) to generate a feedback signal based on the playback corrected error. The feedback anti-noise component of the anti-noise signal may be combined by combiner 50 with the feedforward anti-noise component of the anti-noise signal to generate the anti-noise signal which in turn may be provided to combiner 26 that combines the anti-noise signal with the source audio signal to be reproduced by speaker SPKR.

As depicted in FIG. 2, link control 11 of wireless telephone 10 may generate link control information LCI which may be received by a link control input of ANC circuit 30. Link control information LCI may include any suitable information regarding digital communications link 19, including without limitation, a link quality metric of digital communications link 19. For example, in some embodiments, the link quality metric may comprise a number of bit errors of digital communications link 19. As another example, in these and other embodiments, the link quality metric may comprise a bit error rate of digital communications link 19.

Responsive to the link quality metric indicating unreliability in digital communications link 19, ANC circuit 30 may modify generation of the anti-noise signal. For example, one or more components of ANC circuit 30 may be configured to compare the link quality metric to a threshold, and modify generation of the anti-noise signal responsive based on such comparison (e.g., modify generation of the anti-noise signal responsive to the number of bit errors increasing above a threshold number and/or modify generation of the anti-noise signal responsive to the bit error rate decreasing below a threshold rate).

In some embodiments, ANC circuit 30 may modify generation of the anti-noise signal by modifying adaptation of one or more of adaptive filters 32 and 34A responsive to the link quality metric. Such modification of an adaptive filter 32 and/or 34A may include halting the adaptation of the adaptive filter responsive to the link quality metric (e.g., by causing coefficients generated by W coefficient control block 31 and/or SE coefficient control block 33 to remain constant if the link quality metric indicates unreliability of digital communications link 19). In addition or alternatively, such modification of an adaptive filter 32 and/or 34A may include setting one or more coefficients of the adaptive filter to a predetermined value to remedy disruption of the adapting of the response of the adaptive filter responsive to the link quality metric (e.g., by setting coefficients generated by W coefficient control block 31 and/or SE coefficient control block 33 to values known not to cause disruption to adaptation when adaptation resumes at such time when the link quality metric again indicates reliability of digital communications link 19).

In these and other embodiments, ANC circuit 30 may modify generation of the anti-noise signal by muting the anti-noise signal responsive to the link quality metric. For instance, ANC circuit 30 may mute the anti-noise signal by setting internal gains of adaptive filter 32 and/or feedback filter 44 to zero, responsive to the link quality metric indicating unreliability of digital communications link 19.

In these and other embodiments, ANC circuit 30 may be configured to receive other link control information of another communications link (e.g., link control information regarding another communications link for communicating near-speech signal from near-speech microphone NS or another voice signal) and affect one or more devices coupled to the other communications link responsive to the link quality metric. For example, if ANC circuit 30 halts adaptation for reference microphone R, error microphone E, and/or speaker SPKR for digital communications link 19, ANC circuit 30 may also halt adaption associated with a voice microphone (e.g., near-speech microphone NS) on the other communications link.

As used herein, when two or more elements are referred to as "coupled" to one another, such term indicates that such two or more elements are in electronic communication whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosures have been described in detail, it should be understood that various changes, substitutions, and alterations could be made hereto without departing from the spirit and scope of the disclosure.

What is claimed is:

1. An integrated circuit, comprising:
   an output for providing a signal to a transducer including both source audio for playback to a listener and an anti-noise signal for countering the effects of ambient audio sounds in an acoustic output of the transducer;
   a microphone input for receiving a microphone signal indicative of ambient audio sounds at the transducer;
   a link control input for receiving link control information of a communications link coupling the integrated circuit to one or more of the transducer and a microphone for generating the microphone signal, wherein the link control information includes a link quality metric of the communications link; and
   a processing circuit comprising an adaptive filter having a response that generates the anti-noise signal in conformity with the microphone signal to minimize the ambient audio sounds at the acoustic output of the transducer, wherein the processing circuit modifies generation of the anti-noise signal by modifying adaptation of the adaptive filter responsive to the link quality metric.

2. The integrated circuit of claim 1, wherein the processing circuit modifies the adaptation of the adaptive filter by halting the adaptation of the adaptive filter responsive to the link quality metric.

3. The integrated circuit of claim 1, wherein the processing circuit modifies generation of the anti-noise signal by setting one or more coefficients of the adaptive filter to a predetermined value to remedy disruption of the adapting of the response of the adaptive filter responsive to the link quality metric.

4. The integrated circuit of claim 1, wherein the processing circuit modifies generation of the anti-noise signal by muting the anti-noise signal responsive to the link quality metric.

5. The integrated circuit of claim 1, wherein the processing circuit compares the link quality metric to a threshold, and modifies generation of the anti-noise signal responsive to such comparison.

6. The integrated circuit of claim 1, wherein the link quality metric comprises a number of bit errors of the communications link.

7. The integrated circuit of claim 1, wherein the link quality metric comprises a bit error rate of the communications link.

8. The integrated circuit of claim 1, wherein the processing circuit is further configured to receive second link control information of a second communications link and affect one or more devices coupled to the second communications link responsive to the link quality metric.

9. A method comprising:
receiving link control information of a communications link configured to couple an integrated circuit to one or more of: (i) a transducer for generating sound in response to a signal including both source audio for playback to a listener and an anti-noise signal for countering the effects of ambient audio sounds in an acoustic output of the transducer and (ii) a microphone for generating a microphone signal indicative of ambient audio sounds at the transducer, wherein the link control information includes a link quality metric of the communications link; and
generating with an adaptive filter the anti-noise signal in conformity with the microphone signal to minimize the ambient audio sounds at the acoustic output of the transducer; and
modifying generation of the anti-noise signal by modifying adaptation of the adaptive filter responsive to the link quality metric.

10. The method of claim 9, further comprising modifying the adaptation of the adaptive filter by halting the adaptation of the adaptive filter responsive to the link quality metric.

11. The method of claim 9, further comprising modifying generation of the anti-noise signal by setting one or more coefficients of the adaptive filter to a predetermined value to remedy disruption of the adapting of the response of the adaptive filter responsive to the link quality metric.

12. The method of claim 9, further comprising modifying generation of the anti-noise signal by muting the anti-noise signal responsive to the link quality metric.

13. The method of claim 9, further comprising comparing the link quality metric to a threshold, and modifies generation of the anti-noise signal responsive to such comparison.

14. The method of claim 9, wherein the link quality metric comprises a number of bit errors of the communications link.

15. The method of claim 9, wherein the link quality metric comprises a bit error rate of the communications link.

16. The method of claim 9, further comprising receiving second link control information of a second communications link and affect one or more devices coupled to the second communications link responsive to the link quality metric.

17. A distributed active noise cancellation (ANC) system, comprising:
link control circuitry for receiving link control information of a communications link, wherein the link control information includes a link quality metric of the communications link; and
ANC circuitry for actively cancelling noise, wherein the ANC circuitry comprises an adaptive filter and modifies generation of the anti-noise signal by modifying adaptation of the adaptive filter responsive to the link quality metric.

18. The distributed ANC system of claim 17, wherein the ANC circuitry modifies the adaptation of the adaptive filter by halting the adaptation of the adaptive filter responsive to the link quality metric.

19. The distributed ANC system of claim 17, wherein the ANC circuitry modifies generation of the anti-noise signal by setting one or more coefficients of the adaptive filter to a predetermined value to remedy disruption of the adapting of the response of the adaptive filter responsive to the link quality metric.

20. The distributed ANC system of claim 17, wherein the ANC circuitry modifies generation of the anti-noise signal by muting the anti-noise signal responsive to the link quality metric.

21. The distributed ANC system of claim 17, wherein the ANC circuitry compares the link quality metric to a threshold, and modifies generation of the anti-noise signal responsive to such comparison.

22. The distributed ANC system of claim 17, wherein the link quality metric comprises a number of bit errors of the communications link.

23. The distributed ANC system of claim 17, wherein the link quality metric comprises a bit error rate of the communications link.

24. The distributed ANC system of claim 17, wherein the ANC circuitry is further configured to receive second link control information of a second communications link and affect one or more devices coupled to the second communications link responsive to the link quality metric.

* * * * *

UNITED STATES PATENT AND TRADEMARK OFFICE
CERTIFICATE OF CORRECTION

PATENT NO. : 10,152,960 B2
APPLICATION NO. : 15/053792
DATED : December 11, 2018
INVENTOR(S) : Jon D. Hendrix, Nitin Kwatra and Jeffrey D. Alderson It is certified that error appears in the above-identified patent and that said Letters Patent is hereby corrected as shown below:

In the Specification

Please amend the paragraph beginning at Line 53 of Column 5 as follows:
Wireless telephone 10 may include an ANC circuit 30 for performing adaptive ANC. ANC circuit 30 may include combiner 26 to combine audio signals ia from internal audio sources 24, downlink speech ds which may be received from radio frequency (RF) integrated circuit 12, and the anti-noise signal generated by ANC circuit 30 (which by convention has the same polarity as the noise in reference microphone signal ref and is therefore subtracted by combiner 26), thus generating a digital output audio signal for communication to wireless telephone 10 via digital communications link 19.

Signed and Sealed this
Third Day of November, 2020

Andrei Iancu
*Director of the United States Patent and Trademark Office*